Sept. 27, 1938.　　　　　J. O. LOGAN　　　　　2,131,447
CHLORINE DIOXIDE
Filed June 14, 1937　　　2 Sheets-Sheet 1
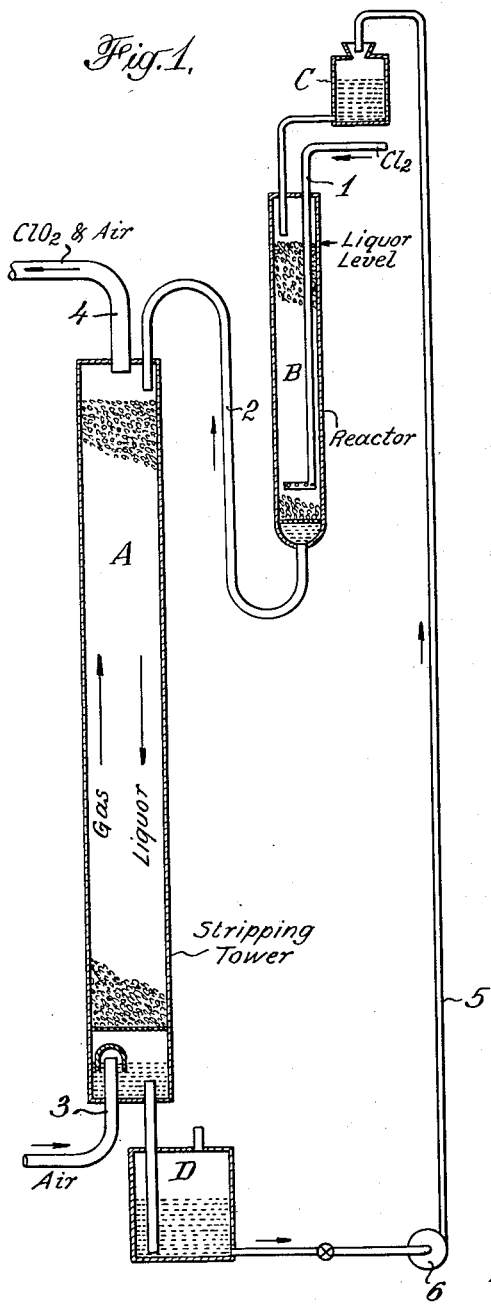
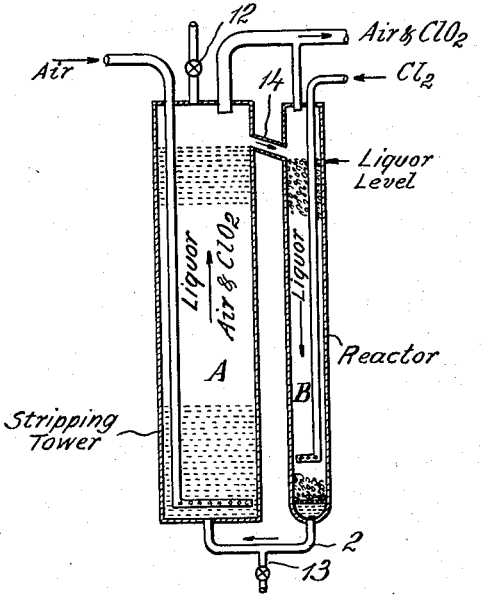
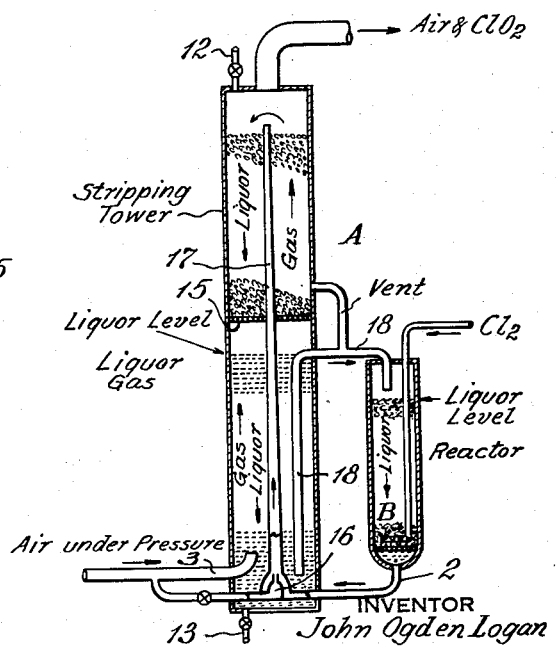
INVENTOR
John Ogden Logan
BY
Pennie, Davis, Marvin + Edmonds
ATTORNEYS Sept. 27, 1938. J. O. LOGAN 2,131,447
CHLORINE DIOXIDE
Filed June 14, 1937 2 Sheets-Sheet 2
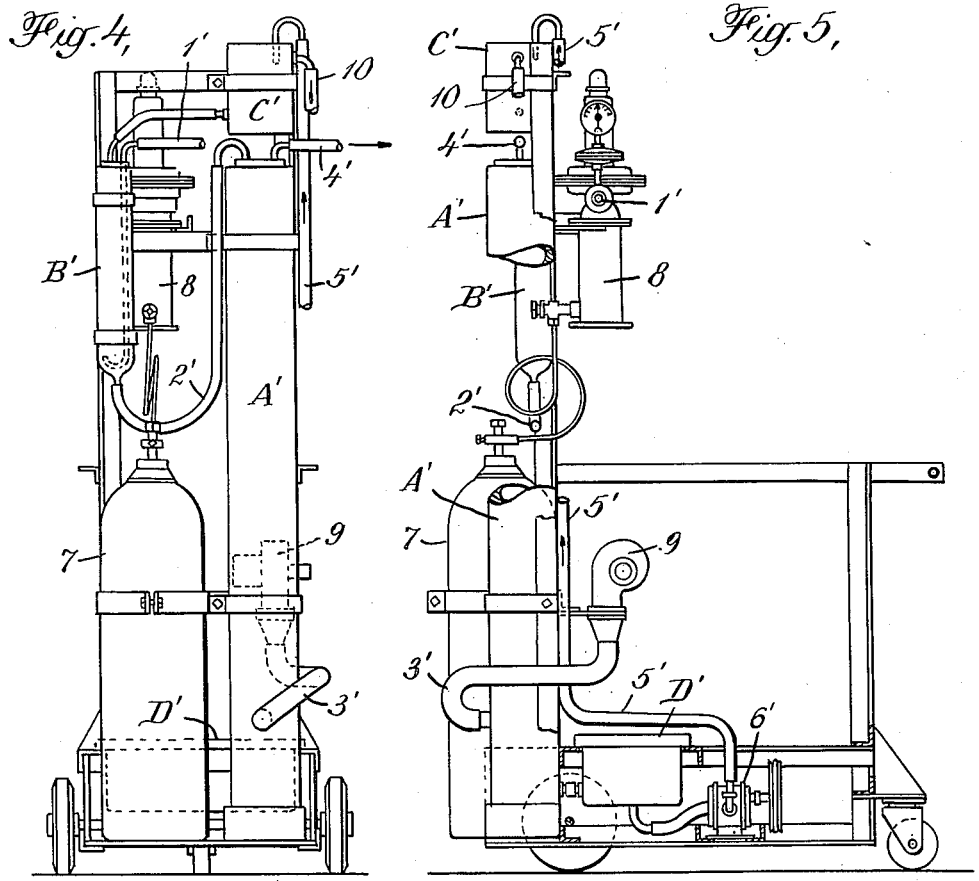
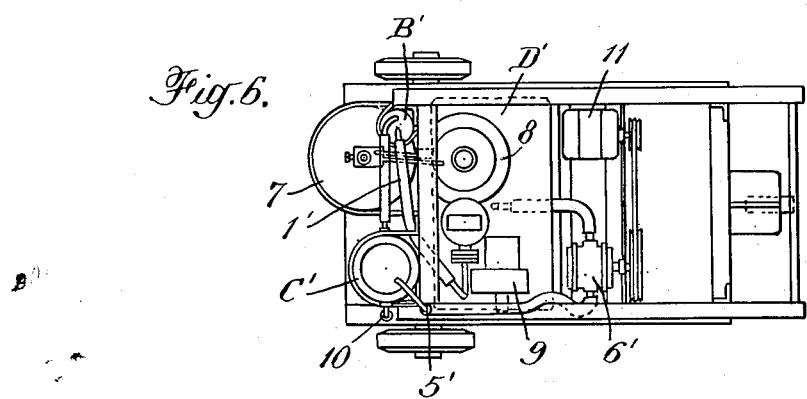
INVENTOR
John Ogden Logan
BY
Pennie, Davis, Marvin & Edmonds
ATTORNEYS

UNITED STATES PATENT OFFICE 2,131,447

CHLORINE DIOXIDE

John Ogden Logan, Niagara Falls, N. Y., assignor to The Mathieson Alkali Works, Inc., New York, N. Y., a corporation of Virginia Application June 14, 1937, Serial No. 148,008

1 Claim. (Cl. 23—152)

This invention relates to an improved method and apparatus for the production of chlorine dioxide. More particularly, it relates to an improved method and apparatus for conducting the reaction between chlorine gas and an aqueous solution of an alkali or alkaline earth metal chlorite, to produce $ClO_2$ completely free of chlorine, in a well regulated manner which possesses greater ease of control and greater safety and efficiency than has hitherto been attained. The process of the present invention is based on the following reaction.

$$Cl_2 + 2ClO_2^- = 2ClO_2 + 2Cl^-$$

The chlorine serves as an oxidizing agent, oxidizing the chlorite ion to chlorine dioxide, the chlorine itself being reduced to chloride ion. This basic reaction has been disclosed in U. S. Patent No. 2,043,284, issued to Cunningham and Losch. In conducting the reaction disclosed in this Cunningham and Losch patent, according to well known and commonly practiced methods of carrying out a reaction between a gas and a solution, very carefully regulated conditions and a very efficient absorption tower are essential. This is essential in order to reduce the chlorine content in the effluent $ClO_2$ gas to a minimum.

Chlorine dioxide is used in certain operations in which the presence of even a small amount of chlorine as a contaminant renders it unfit for use.

In carrying out this reaction an inert gas must be passed through the solution in order to facilitate recovery of the formed $ClO_2$, and also to prevent the accumulation of $ClO_2$ in concentrations which would present a serious explosion hazard. Due to the stripping effect of this inert gas, unreacted $Cl_2$ in varying percentages is frequently removed from the reaction zone along with the mixture of the desired $ClO_2$ and the inert gas. Such difficulties of operation are usually encountered, particularly when operating on a large commercial scale, and result in the production of $ClO_2$ gas which is unsuitable for many purposes due to the presence of chlorine therein. Even though, as a result of very carefully controlled conditions and the use of the most efficient apparatus, the unreacted chlorine may be present only in relatively small quantities, it nevertheless frequently renders the produced $ClO_2$ unfit for the purposes desired.

The present invention has for its object a method and apparatus for producing $ClO_2$ from the oxidation of an alkali metal, alkaline earth metal, or magnesium chlorite by chlorine. The $ClO_2$ may be produced in controlled amounts and with high efficiency. The yield of $ClO_2$ is very nearly theoretical and the chlorite in the original solution is substantially all utilized. The danger of explosion is done away with, and the desired $ClO_2$ may be produced in controllable quantities at any desired rate. The apparatus which I have devised and which is hereinafter more fully described is suitable for the carrying out of the reaction according to the process of my invention and is adaptable to laboratory or large scale commercial use; or it may readily be incorporated into a small portable commercial unit. There is no necessity for elaborate and complicated control or apparatus in order to prevent contamination of the product with chlorine. My apparatus provides a safe, compact, economical means for producing $ClO_2$ from chlorite, which is absolutely pure with respect to undesirable chlorine.

I have found that a predetermined quantity of $ClO_2$ at a predetermined partial pressure, completely free of chlorine, may be prepared by causing a regulated quantity of chlorine to react with chlorite in a separate vessel removed from the stripping effect of the inert gas. This operation is conducted in such a way that the chlorine completely dissolves and reacts with the chlorite after which the solution is conducted to a stripping tower where the $ClO_2$ is removed by passing an inert gas through the solution. The essential feature of my process may be said to be that the chlorine is completely reacted with the chlorite solution, without permitting the solution in which the chlorine dioxide is forming to come into contact with a gaseous phase until after the chlorine is completely reacted. This is accomplished by introducing the chlorine into a suitable vessel through which chlorite solution is passed. This solution, which has become charged with $ClO_2$ and also contains unreacted chlorite is passed continuously from the reaction vessel into a stripping tower where the $ClO_2$ is removed by the stripping effect of air or other inert gas which is passed through it. Considerable variation in the concentration of the chlorite solution and in the rate and amount of chlorine introduced may occur. After the produced $ClO_2$ has been removed from the solution in the stripping tower, this solution, which in my preferred method of operating, should contain excess unreacted chlorite, is then returned to the reaction vessel for further reaction with chlorine. This step is repeated until the chlorite is substantially all reacted. I prefer to operate in a cyclic manner whereby a portion of the dissolved chlorite reacts with chlorine on each passage through the apparatus. By this expedient, as will be more completely explained below, decided advances in efficiency of operation and in increasing the safety factor are realized.

Various forms and modifications of apparatus may be used for the operation of my invention. A few specific examples of these highly efficient modifications will serve to illustrate suitable forms of apparatus for the carrying out of my process. These illustrative embodiments of my invention which are hereinafter more fully described and presented may best be understood by reference to the accompanying drawings in which:

Fig. 1 illustrates diagrammatically a simple laboratory apparatus suitable for producing $ClO_2$ on a small scale, according to the process of my invention;

Fig. 2 illustrates diagrammatically an apparatus for producing $ClO_2$ designed in such a way that the air which is injected as the stripping agent further serves to circulate the solution through the apparatus;

Fig. 3 illustrates diagrammatically an apparatus for producing $ClO_2$ in which an internal air lift operated by a diverted portion of the air supplied, serves to circulate the solution through the apparatus.

Figs. 4, 5 and 6 are sketches which illustrate in section a representative small portable unit designed to produce controllable quantities of $ClO_2$ at a controllable rate according to the process of my invention.

In Fig. 1, the chlorite solution flows by gravity from reservoir C which has a capacity of about 500 cc., into the reaction tower B which is made from a 36 mm. diameter glass tube and is approximately 12 in. long. This tube is packed with ¼" saddle packing and is operated flooded. The chlorine is advantageously introduced near the bottom of the tower through delivery tube 1 which should be equipped with a control valve and flow meter for regulating the $Cl_2$ introduced. By regulating the rate of chlorite liquor flow as well as the rate of $Cl_2$ introduced the chlorine is completely reacted before bubbles of the gas can reach the surface in the upper part of the tower. This tower might be operated without packing, but during such an operation there is danger that a portion of the introduced $Cl_2$ bubbles will reach the surface unreacted and pass off into the air. The solution containing the produced $ClO_2$ flows by gravity through tube 2 into stripping tower A which is a glass tube 60 mm. in diameter and approximately 30 in. long. Due to the relatively rapid flow of chlorite liquor through the reaction tower, a portion of the $Cl_2$ may be entrained and carried into the connection line 2. Before this chlorine reaches tower A, however, it will have all dissolved and reacted with chlorite to produce $ClO_2$. Tower A is packed with ½" saddle packing and is most advantageously operated as a trickle tower in order to obtain the full stripping effect of the inert gas as the liquor charged with $ClO_2$ passes downward through the tower. The $ClO_2$ is swept upward in a current of air which is introduced through pipe 3. The mixture of air and $ClO_2$ which is completely free of $Cl_2$ passes out through an exit tube 4 at the top of the tower. The stripped liquor flows from the tower into the reservoir D which has a capacity of approximately 2 l. It is then returned to C through connection 5 by a pump at 6 or, as is possible with a small unit of this nature, it may be transferred manually.

The following experimental example will serve to illustrate the operation of a laboratory scale unit such as is shown in Fig. 1 and described above. A 25% solution of $NaClO_2$ was circulated manually at the rate of 230 cc. per minute. Chlorine regulated by flow through a calibrated flow meter was passed into the reaction tower B at the rate of 100 cc. per minute. Air was blown into the stripping tower A at a rate of 9.6 liters per min. Equilibrium conditions were reached in about 30 minutes and the apparatus was operated for 2¾ hours. The $ClO_2$ output after the first ½ hour was quite uniform, averaging 33.2 gm. $ClO_2$ per hour. Tests made at various times during the run failed to show the presence of any $Cl_2$ in the effluent gas. The yield of $ClO_2$ based on the $Cl_2$ introduced into the reactor was 98% of the theoretical. This value includes the $ClO_2$ obtained from the outlet plus that which remained dissolved in the liquor. Due to the inconvenience of circulating these small quantities of liquor, the liquor flow is low and is not proportionate to the rate which would be employed in a unit having a circulatory device. As a result, the concentration of $ClO_2$ in the liquor in this example was slightly greater than the amount recommended below for reasons of safety. In the use of this small unit, however, no difficulties have been encountered with explosions while operating as described.

Various modifications in the apparatus suitable for carrying out the process of my invention may be employed. Two such variations are illustrated diagrammatically in Figs. 2 and 3. In both of these, it will be observed, the structure is such that the reaction between the $Cl_2$ and the chlorite takes place in a region removed from the stripping tower, and provision is made for securing a flow of liquor sufficiently rapid to prevent the escape of gaseous $Cl_2$ and $ClO_2$ in the reaction tower B.

In Fig. 2 the air which is introduced near the bottom of the stripping tower A serves the additional purpose of circulating the chlorite liquor throughout the apparatus. The upward motion of the air carrying with it the produced $ClO_2$ creates a circulatory motion in the liquor due to the difference in density between the gas-liquor mixture in A as compared to the liquor only in B, which causes it to flow back to the reaction chamber B through connection 14. In this type of apparatus the speed of circulation of the liquor depends on the rate of introducing air into the apparatus. The circulation must be maintained at a rate sufficient to prevent any $Cl_2$ introduced in B from escaping as a gas at the top of the tower. In this apparatus while stripping tower A may be packed or open, it must be operated in a flooded condition. Reaction tower B is, of course, also operated in a flooded condition. The chlorite liquor may be introduced and removed after the operation by connections 12 and 13 respectively.

Fig. 3 illustrates an apparatus in which liquor circulation is produced by means of an internal air lift which is operated by air diverted from the main air inlet into the stripping tower. In this form of apparatus the stripping tower A is divided into two portions by the packing support 15. The upper portion of the tower is operated as a non-flooded packed trickle tower, while the lower portion is operated unpacked and flooded. The liquor is caused to circulate from reactor B through pipes 2 and 17 to the top of the stripping tower by means of the air jet 16. The circuit is completed back to the reaction chamber by means of tube 18.

In order to illustrate one commercial embodiment of the process of my invention, a description of a relatively small capacity portable commercial unit is here presented. By reference to Figs. 4, 5 and 6 which are sectional views of such an illustrative portable apparatus, the details of construction will be appreciated. In these elevational views of the portable unit, reference letters and numerals are used which show the relationship between the fundamental parts in this apparatus with the corresponding parts in the laboratory apparatus shown in Fig. 1. Thus the stripping tower which in Fig. 1 is "A" in Figures 4, 5 and 6 becomes A', etc. The various parts of this assembly are supported by and attached to a metal framework. The chlorine supply is furnished by a regulation cylinder of chlorine 7 which is connected to reaction column B' by means of a reducing valve and gage assembly 8. This permits a careful control of the chlorine introduced through connection 1' which in turn governs the $ClO_2$ produced. The chlorite liquor flows from reservoir C' into reaction column B' and thence through connection 2' to the top of stripping tower A' where it passes countercurrent to the air blown in through 3' by blower 9. The stripped liquor passes from the bottom of the tower into the reservoir D' from which it is recirculated by pump 6' which is run by motor 11, through connection 5' to the top reservoir. To avoid overflowing container C' in the event that the regulation of the process is not properly correlated, an overflow pipe 10 connects with the larger container D'.

The following data will serve to illustrate a typical operation of a portable unit such as is described in the previous paragraph. 8.75 lbs. commercial chlorite containing 75% $NaClO_2$ was dissolved in 3.5 gallons of water. This was circulated through the generator at a speed to produce a safe concentration of $ClO_2$, the characteristics of which will be more fully developed below. The evolution of the $ClO_2$ was measured at various $Cl_2$ gage readings. At 10 lbs. gage the output was 359 gm. $ClO_2$ per hour, at 7.5 lbs. the output was 187 gm. $ClO_2$ per hour, and at 5 lbs. gage, the output was 122 gm. $ClO_2$ per hour.

It has been found that the above-described cyclic type of operation in which a part of the chlorite is oxidized with each passage through the reactor, is more efficient and, therefore, to be preferred to an operation in which the chlorite is substantially all reacted during a single passage through the apparatus. In order for this latter procedure to be feasible, the chlorite solution must be very dilute. If there is any substantial quantity of chlorite in the liquor which, in such a case, must be fed into the reaction tower very slowly, and sufficient chlorine be added to completely oxidize the chlorite in a single passage, a very high concentration of $ClO_2$ builds up in the chlorite liquor. The solution requires a longer period to reach the stripping tower and when it does arrive, it is given poor contact with the stripping medium. This results in a decreased amount of $ClO_2$ in the air stream, but a high and dangerous concentration in the liquid phase. If, however, the chlorite solution used is very dilute, the regulatory feature of control of the rate of $ClO_2$ is largely destroyed, since the desired gas can be produced only at a limited rate and with a low partial pressure due to the small quantity of chlorite to be reacted.

It is well known that $ClO_2$ in admixture with air forms explosive mixtures. While in my process any inert gas, such as, for example, nitrogen, may be used to sweep the $ClO_2$ from the solution in the stripping tower, because of economic reasons air is usually preferred. The process of my invention may be operated in such a manner that the $ClO_2$-air mixtures are always within safe non-explosive limits. The factor which makes this possible is the proper regulation of the liquor flow through the reaction vessel. The produced $ClO_2$, as it arrives in the stripping tower, is in solution in the chlorite liquor and exerts a partial pressure proportional to its concentration in a dissolved state. Experimental results show that a partial pressure of below 15 mm., Hg, is below the safety limit. This pressure corresponds to a concentration of 1.5 gm. $ClO_2$ per liter. As pointed out above, in the operation of small laboratory scale apparatus, concentrations somewhat above 1.5 g. per liter may be employed. When using a commercial unit, however, where comparatively large quantities of $ClO_2$ are being produced, it is advisable in order to remove all explosion hazards to circulate the chlorite liquor at a rate sufficient to maintain concentration of dissolved $ClO_2$ less than about 1.5 g. per liter. It is pointed out that this is in no way a limitation on the amount of $Cl_2$ which may be introduced or upon the $ClO_2$ produced. If it is desired to increase these factors, the rate of circulation of the liquor is proportionately increased to cause the $ClO_2$ concentration per liter to remain at a safe figure. It should also be noted that keeping the $ClO_2$ at a relatively low concentration increases the sensitivity of the apparatus, since, as pointed out above, when the concentration of the $ClO_2$ becomes too high, the stripping gas does not function efficiently and the proportion of $ClO_2$ in the effluent gas is decreased.

High efficiencies result in the process of my invention, both from the point of view of the chlorine introduced and also of the chlorite employed. As has been mentioned previously, the amount and rate of production of $ClO_2$ is entirely dependent on the $Cl_2$ introduced and the speed of circulation of the solution and not on the concentration of chlorite in the solution. This is true, provided the chlorite solution is not so diluted that its concentration is less than that of the $Cl_2$ introduced. The above efficiencies are illustrated by the following table which contains the results of a typical experimental run during which analyses were made. It represents the results obtained by starting with a concentrated solution of chlorite and passing in chlorine at a uniform rate until the chlorite in solution was practically exhausted.

| Time (hrs.) | $NaClO_2$ conc. gm. per l. | Chlorite percent utilized | Partial pressure of evolved $ClO_2$ |
|---|---|---|---|
| 0 | 190 | 0 | 0 |
| .5 | 177.0 | 6.8 | 6.0 |
| 1.0 | 155.0 | 18.4 | 5.5 |
| 2.0 | 133.0 | 40.5 | 5.7 |
| 3.0 | 61.8 | 67.5 | 5.4 |
| 3.5 | 32.3 | 83.0 | 5.7 |
| 3.75 | 21.3 | 88.7 | 4.3 |
| 4.0 | 8.3 | 95.6 | 4.3 |

In this test no chlorine was contained in the product even when the chlorite was over 95% exhausted and the gas evolved did not decrease in concentration until the $NaClO_2$ was approximately 85% utilized. This test also indicates that the reaction goes very nearly 100% to completion, in spite of the sodium chloride concentration which is built up.

In the Cunningham and Losch patent, No. 2,043,284, it was pointed out that the chlorine component of a $Cl_2$-$ClO_2$ gas mixture could be removed by passing such a mixture through a chlorite solution. The process and apparatus of my invention afford a means for accomplishing the same result in a most efficient manner and with complete safety. Applying my process, the $Cl_2$-$ClO_2$ gas mixture is passed through the reaction chamber through the same inlet by which the pure $Cl_2$ would ordinarily be introduced. In this way, my process may be employed to completely purify $ClO_2$ with respect to $Cl_2$ with the additional advantage that increased quantities of $ClO_2$ are produced during the purification as a result of the reaction of the contaminating chlorine with chlorite.

In commercial practice it is sometimes desirable to have a generator capable of providing gas at different rates to separate points of use. This may be accomplished utilizing the present method by having a number of reaction vessels and stripping towers and circulating the chlorite solution by means of one pump for the several units. Air and chlorine would each be provided from a single source connected to the units by a manifold and individual control valves so that each reactor and tower might be operated at a rate independent of the remaining parts.

In constructing generators for use in laboratories or where the desired output is small the entire apparatus may be constructed of glass. For larger commercial units the stripping tower should be made of stoneware as should, also, the pump for circulating the liquor. The reaction vessel should be of glassware and all liquor lines should be glassware or suitably resistant metal. Connections can be made of high grade rubber tubing. The air supply system need not be constructed of corrosion resistant materials.

I claim:

A process for producing chlorine dioxide free of chlorine which comprises circulating an aqueous solution containing a chlorite of the class consisting of the chlorites of the alkali metals, the alkaline earth metals, and magnesium, in a cyclic manner between an enclosed reaction chamber and a separate stripping vessel, supplying a controlled quantity of chlorine to the reaction chamber, stripping the formed chlorine dioxide from the solution flowing into the stripping tower from the reaction chamber by introducing an inert gas into the stripping tower, and correlating the speed of circulation of the aqueous solution and the rate of introduction of chlorine in such a manner that the introduced chlorine is completely dissolved in and reacted with the chlorite solution before said solution enters the stripping tower.

JOHN OGDEN LOGAN.